US012186662B2

(12) United States Patent
Liu et al.

(10) Patent No.: US 12,186,662 B2
(45) Date of Patent: Jan. 7, 2025

(54) DATA PROCESSING METHOD IN VIRTUAL SCENE, DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventors: Xiaohao Liu, Shenzhen (CN); Peicheng Liu, Shenzhen (CN); Shuai Jiang, Shenzhen (CN); Lusi Wan, Shenzhen (CN); Qinghua Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 231 days.

(21) Appl. No.: 17/838,590

(22) Filed: Jun. 13, 2022

(65) Prior Publication Data
US 2022/0305384 A1 Sep. 29, 2022

Related U.S. Application Data

(63) Continuation of application No. PCT/CN2021/125439, filed on Oct. 21, 2021.

(30) Foreign Application Priority Data

Dec. 23, 2020 (CN) .......................... 202011556426.7

(51) Int. Cl.
*A63F 13/5375* (2014.01)
*A63F 13/5378* (2014.01)

(52) U.S. Cl.
CPC ...... *A63F 13/5375* (2014.09); *A63F 13/5378* (2014.09); *A63F 2300/305* (2013.01); *A63F 2300/307* (2013.01)

(58) Field of Classification Search
None
See application file for complete search history.

(56) References Cited

U.S. PATENT DOCUMENTS 9,597,599 B2 * 3/2017 Saretto .................... A63F 13/77
11,565,181 B2 * 1/2023 Qiu ....................... A63F 13/837
(Continued)

FOREIGN PATENT DOCUMENTS

| CN | 108635852 A | 10/2018 |
|---|---|---|
| CN | 109876442 A | 6/2019 |

(Continued)

OTHER PUBLICATIONS

The Japan Patent Office (JPO) Notification of Reasons for Refusal for Application No. 2022-573162 and Translation Nov. 14, 2023 7 Pages.

(Continued)

*Primary Examiner* — Seng H Lim
(74) *Attorney, Agent, or Firm* — ANOVA LAW GROUP PLLC

(57) ABSTRACT

A data processing method in a virtual scene, a device, a storage medium, and a program product are provided. The method includes receiving an operation instruction, the operation instruction being an instruction triggered by a route drawing operation on a second minimap that is displayed on a second terminal; generating path information of a target virtual object in a virtual scene based on the operation instruction; and transmitting the path information to a first terminal, the first terminal displaying a path trajectory corresponding to the path information on a first minimap that is displayed by the first terminal.

19 Claims, 12 Drawing Sheets

(56) References Cited

U.S. PATENT DOCUMENTS

| | | | |
|---|---|---|---|
| 2003/0220735 A1* | 11/2003 | Nimura | G01C 21/3878 |
| | | | 340/995.12 |
| 2006/0258453 A1* | 11/2006 | Kando | A63F 13/52 |
| | | | 463/36 |
| 2007/0105626 A1* | 5/2007 | Cho | A63F 13/56 |
| | | | 463/37 |
| 2008/0294782 A1* | 11/2008 | Patterson | A63F 13/60 |
| | | | 709/227 |
| 2009/0104990 A1* | 4/2009 | Tsujino | A63F 13/5255 |
| | | | 463/32 |
| 2010/0197389 A1* | 8/2010 | Ueda | A63F 13/30 |
| | | | 463/43 |
| 2013/0337916 A1* | 12/2013 | Saretto | A63F 13/847 |
| | | | 463/43 |
| 2014/0221082 A1* | 8/2014 | Chen | G07F 17/329 |
| | | | 463/25 |
| 2014/0280180 A1* | 9/2014 | Edecker | G06F 16/285 |
| | | | 707/769 |
| 2014/0344390 A1 | 11/2014 | Iwamoto et al. | |
| 2017/0056773 A1* | 3/2017 | Zhu | A63F 13/30 |
| 2019/0366212 A1* | 12/2019 | Kusakihara | A63F 13/426 |
| 2020/0316473 A1* | 10/2020 | Qiu | A63F 13/56 |
| 2021/0331070 A1 | 10/2021 | Song | |
| 2022/0040582 A1* | 2/2022 | Wan | A63F 13/5372 |

FOREIGN PATENT DOCUMENTS

| | | |
|---|---|---|
| CN | 110368691 A | 10/2019 |
| CN | 111744197 A | 10/2020 |
| CN | 112569600 A | 3/2021 |
| KR | 20160060249 A | 5/2016 |
| TW | 200800343 A | 1/2008 |

OTHER PUBLICATIONS

Intellectual Property Office of Singapore Office Action including Search Report and Written Opinion for Application No. 11202205570R Feb. 6, 2024 10 pages.

China National Intellectual Property Administration (CNIPA) Office Action 1 for 202011556426.7 Apr. 24, 2022 10 Pages (including translation).

The World Intellectual Property Organization (WIPO) International Search Report for PCT/CN2021/125439 Jan. 19, 2022 7 Pages (including translation).

Korean Intellectual Property Office (KIPO) Office Action 1 for 20227031432 Aug. 5, 2024 36 Pages (including translation).

* cited by examiner

DATA PROCESSING METHOD IN VIRTUAL SCENE, DEVICE, STORAGE MEDIUM, AND PROGRAM PRODUCT

RELATED APPLICATIONS

This application is a continuation application of PCT Application No. PCT/CN2021/125439, filed on Oct. 21, 2021, which in turn claims priority to Chinese Patent Application No. 202011556426.7, entitled "PATH INFORMATION TRANSMISSION METHOD IN VIRTUAL SCENE, COMPUTER DEVICE, AND STORAGE MEDIUM" filed on Dec. 23, 2020. The two applications are incorporated herein by reference in their entirety.

FIELD OF THE TECHNOLOGY

This application relates to the field of virtual scene technologies, and in particular, to a data processing method in a virtual scene, a device, a storage medium, and a program product.

BACKGROUND OF THE DISCLOSURE

A battle game is a game in which a plurality of user accounts compete in the same scene. In one example, the battle game may be a multiplayer online battle arena (MOBA) game, in which a user may send signals to virtual objects on the same camp by triggering a control.

In the related technology, a location point may be marked by using a minimap superimposed on a virtual scene interface. When a player marks the location point on the minimap, synchronization of the location point to a minimap displayed on a corresponding terminal of each virtual object on the same camp may automatically triggered, to prompt teammates to move to the marked position point.

However, in the related technology, a player can share only location point information when marking a location point and sending a location point signal, resulting in a poor effect of moving prompt information in a virtual scene.

SUMMARY

Embodiments of this application provide a data processing method in a virtual scene, a device, a storage medium, and a program product, to improve the effect of performing moving prompting in a virtual scene. The technical solutions are as follows:

One aspect of the present disclosure provides a data processing method in a virtual scene performed by a computer device. The method includes receiving an operation instruction, the operation instruction being an instruction triggered by a route drawing operation on a second minimap that is displayed on a second terminal; generating path information of a target virtual object in a virtual scene based on the operation instruction; and transmitting the path information to a first terminal, the first terminal displaying a path trajectory corresponding to the path information on a first minimap that is displayed by the first terminal.

Another aspect of the present disclosure provides a data processing method in a virtual scene, performed by a first terminal. The method includes displaying a virtual scene interface, the virtual scene interface displaying scene pictures of a virtual scene; displaying a first scene picture in the virtual scene interface, a first minimap of the virtual scene being superimposed on the first scene picture; and displaying a path trajectory corresponding to a route drawing operation on the first minimap, the route drawing operation being performed on a second minimap displayed on a second terminal; the second minimap being a minimap included in a path planning interface on the second terminal.

According to still another aspect, a non-transitory computer-readable storage medium is provided, storing at least one instruction, at least one program, a code set, or an instruction set, the at least one instruction, the at least one program, the code set, or the instruction set being loaded and executed by a processor to implement the foregoing data processing method in a virtual scene.

The technical solutions provided in the embodiments of this application have at least the following beneficial effects:

By performing the route drawing operation for the target virtual object in the second minimap, the operation instruction is triggered and path information is generated based on the operation instruction, and the path information is sent to the first terminal corresponding to the target virtual object, so that the first terminal may display the path trajectory corresponding to the path information in the first minimap. Therefore, corresponding path information may be separately generated for each virtual object, and is separately sent to the corresponding second terminal for display, thereby improving the effect of performing moving path prompting in the virtual scene.

The foregoing general descriptions and the following detailed descriptions are merely for illustration and explanation purposes and are not intended to limit this application.

BRIEF DESCRIPTION OF THE DRAWINGS

Accompanying drawings herein are incorporated into a specification and constitute a part of this specification, show embodiments that conform to this application, and are used for describing a principle of this application together with this specification.

DESCRIPTION OF EMBODIMENTS

Embodiments are described herein in detail, and examples of the embodiments are shown in the accompanying drawings. When the following description is made with reference to the accompanying drawings, unless otherwise indicated, the same numerals in different accompanying drawings represent the same or similar elements. The implementations described in the following embodiments do not represent all implementations that are consistent with this application. On the contrary, the implementations are merely examples of apparatuses and methods that are described in detail in the appended claims and that are consistent with some aspects of this application.

Figure 1:
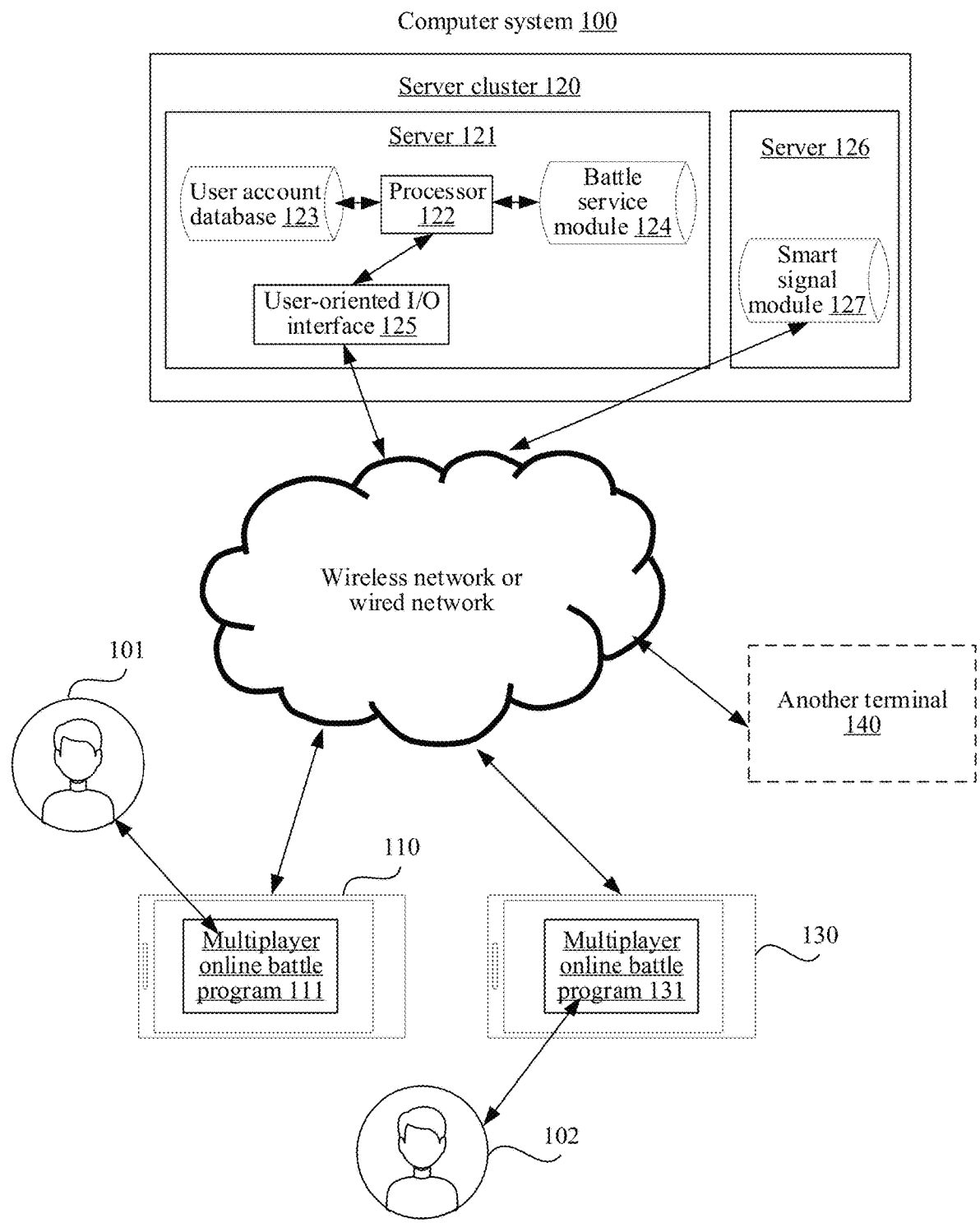
FIG. 1 is a structural block diagram of a computer system according to an embodiment of this application.

FIG. 1 is a structural block diagram of a computer system according to an embodiment of this application. The computer system 100 includes: a first terminal 110, a server cluster 120, and a second terminal 130.

A client 111 supporting a virtual scene is installed and run on the first terminal 110, and the client 111 may be a multiplayer online battle program. When the first terminal runs the client 111, a user interface (UI) of the client 111 is displayed on a screen of the first terminal 110. The client may be any one of a military simulation program, a MOBA game, and a simulation game (SLG). In this embodiment, an example in which the client is a MOBA game is used for description. The first terminal 110 is a terminal used by a first user 101. The first user 101 uses the first terminal 110 to control a first virtual role located in the virtual scene to perform activities, and the first virtual role may be referred to as a master virtual role of the first user 101. The activities of the first virtual role include, but are not limited to: at least one of adjusting body postures, crawling, walking, running, riding, flying, jumping, driving, picking, shooting, attacking, or throwing. For example, the first virtual role is a first virtual character, such as a simulated character role or a cartoon character role.

A client 131 supporting the virtual scene is installed and run on the second terminal 130, and the client 131 may be a multiplayer online battle program. When the second terminal 130 runs the client 131, a UI of the client 131 is displayed on a screen of the second terminal 130. The client may be any one of a military simulation program, a MOBA game, an escape shooting game, and an SLG. In this embodiment, an example in which the client is a MOBA game is used for description. The second terminal 130 is a terminal used by a second user 102. The second user 102 uses the second terminal 130 to control a second virtual role located in the virtual scene to perform activities, and the second virtual role may be referred to as a master virtual role of the second user 102. For example, the second virtual role is a second virtual character, such as a simulated character role or a cartoon character role.

For example, virtual scene is a virtual scene displayed (or provided) when an application is run on a terminal. The virtual scene may be a simulated environment scene of a real world, or may be a semi-simulated semi-fictional three-dimensional (3D) environment scene, or may be an entirely fictional 3D environment scene. The virtual scene may be any one of a two-dimensional (2D) virtual scene, a 2.5-dimensional virtual scene, and a 3D virtual scene, and description is made by using an example in which the virtual scene is a 3D virtual scene in the following embodiments, but this is not limited. In some embodiments, the virtual scene is further used for a virtual scene battle between at least two virtual roles. In some embodiments, there are virtual resources available to the at least two virtual roles in the virtual scene. In some embodiments, the virtual scene includes a virtual world provided with a square map. The square map includes a lower left corner region and an upper right corner region that are symmetrical. Virtual roles on two opposing camps occupy the regions respectively, and the objective of each camp is to destroy a target building/fort/base/Nexus deep in the opponent's region to win victory.

Virtual object: a movable object in a virtual scene. The movable object may be at least one of a virtual character, a virtual animal, and a cartoon character. In some embodiments, when the virtual scene is a 3D virtual scene, the virtual object may be a 3D model. Each virtual object has a shape and a volume in the 3D virtual scene, and occupies some space in the 3D virtual scene. In some embodiments, the virtual role is a 3D role constructed based on 3D human skeleton technology. The virtual role wears different skins to implement different appearances. In some implementations, the virtual role may be alternatively implemented by using a 2.5-dimensional model or a 2D model. This is not limited in this embodiment.

MOBA game is an arena game in which different virtual teams on at least two opposing camps occupy respective map regions on a map provided in a virtual scene, and compete against each other using specific victory conditions as goals. The victory conditions include, but are not limited to at least one of occupying forts or destroy forts of the opposing camps, killing virtual roles in the opposing camps, ensure own survivals in a specified scenario and time, seizing a specific resource, and outscoring the opponent within a specified time. The battle arena game may take place in rounds. The same map or different maps may be used in different rounds of the battle arena game. Each virtual team includes one or more virtual roles, such as 1 virtual role, 3 virtual roles, or 5 virtual roles. MOBA game is a game in which several forts are provided in a virtual world, and users on different camps control virtual roles to battle in the virtual world, occupy forts or destroy forts of the opposing camp. For example, in the MOBA game, the users may be divided into two opposing camps. The virtual roles controlled by the users are scattered in the virtual world to compete against each other, and the victory condition is to destroy or occupy all enemy forts. The MOBA game takes place in rounds. A duration of a round of the MOBA game is from a time point at which the game starts to a time point at which the victory condition is met.

In some embodiments, the first virtual character and the second virtual character are located in the same virtual scene. In some embodiments, the first virtual character and the second virtual character may belong to the same camp, the same team, or the same organization, have a friend relationship, or have a temporary communication permission. In some embodiments, the first virtual character and the second virtual character may be on different camps, different teams, or different organizations, or have a hostile relationship with each other.

In some embodiments, the client installed on the first terminal 110 is the same as that installed on the second terminal 130, or the clients installed on the two terminals are the same type of clients on different operating system platforms (Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types, the device type including at least one of a smartphone, a tablet computer, an e-book reader, a Moving Picture Experts Group Audio Layer III (MP3) player, a Moving Picture Experts Group Audio Layer IV (MP4), a laptop, and a desktop computer.

FIG. 1 shows only two terminals. However, a plurality of other terminals 140 may access the server cluster 120 in different embodiments. In some embodiments, one or more terminals 140 are terminals corresponding to a developer. A developing and editing platform for the client of a virtual scene is installed on the terminal 140. The developer may edit and update the client on the terminal 140 and transmit an updated client installation package to the server cluster 120 through a wired or wireless network. The first terminal 110 and the second terminal 130 may download the client installation package from the server cluster 120 to update the client.

The first terminal 110, the second terminal 130, and the another terminal 140 are connected to the server cluster 120 through the wireless network or the wired network.

The server cluster 120 includes at least one of one server, a plurality of servers, a cloud computing platform, and a virtualization center. The server cluster 120 is configured to provide a backend service for a client supporting a 3D virtual scene. In some embodiments, the server cluster 120 is responsible for primary computing work, and the terminal is responsible for secondary computing work; the server cluster 120 is responsible for secondary computing work, and the terminal is responsible for primary computing work; or the server cluster 120 and the terminal perform collaborative computing by using a distributed computing architecture between each other.

In an example, the server cluster 120 includes a server 121 and a server 126. The server 121 includes a processor 122, a user account database 123, a battle service module 124, and a user-oriented input/output (I/O) interface 125. The processor 122 is configured to load instructions stored in the server 121, and process data in the user account database 121 and the battle service module 124. The user account database 121 is configured to store data of user accounts used by the first terminal 110, the second terminal 130, and the another terminal 140, for example, avatars of the user accounts, nicknames of the user accounts, battle effectiveness indexes of the user accounts, and service zones of the user accounts. The battle service module 124 is configured to provide a plurality of battle rooms for the users to battle, such as a 1V1 battle room, a 3V3 battle room, and a 5V5 battle room. The user-oriented I/O interface 125 is configured to establish communication between the first terminal 110 and/or the second terminal 130 through the wireless network or the wired network for data exchange. In some embodiments, a smart signal module 127 is disposed in the server 126, and the smart signal module 127 is configured to implement the data processing method in a virtual scene provided in the following embodiment.

Figure 2:
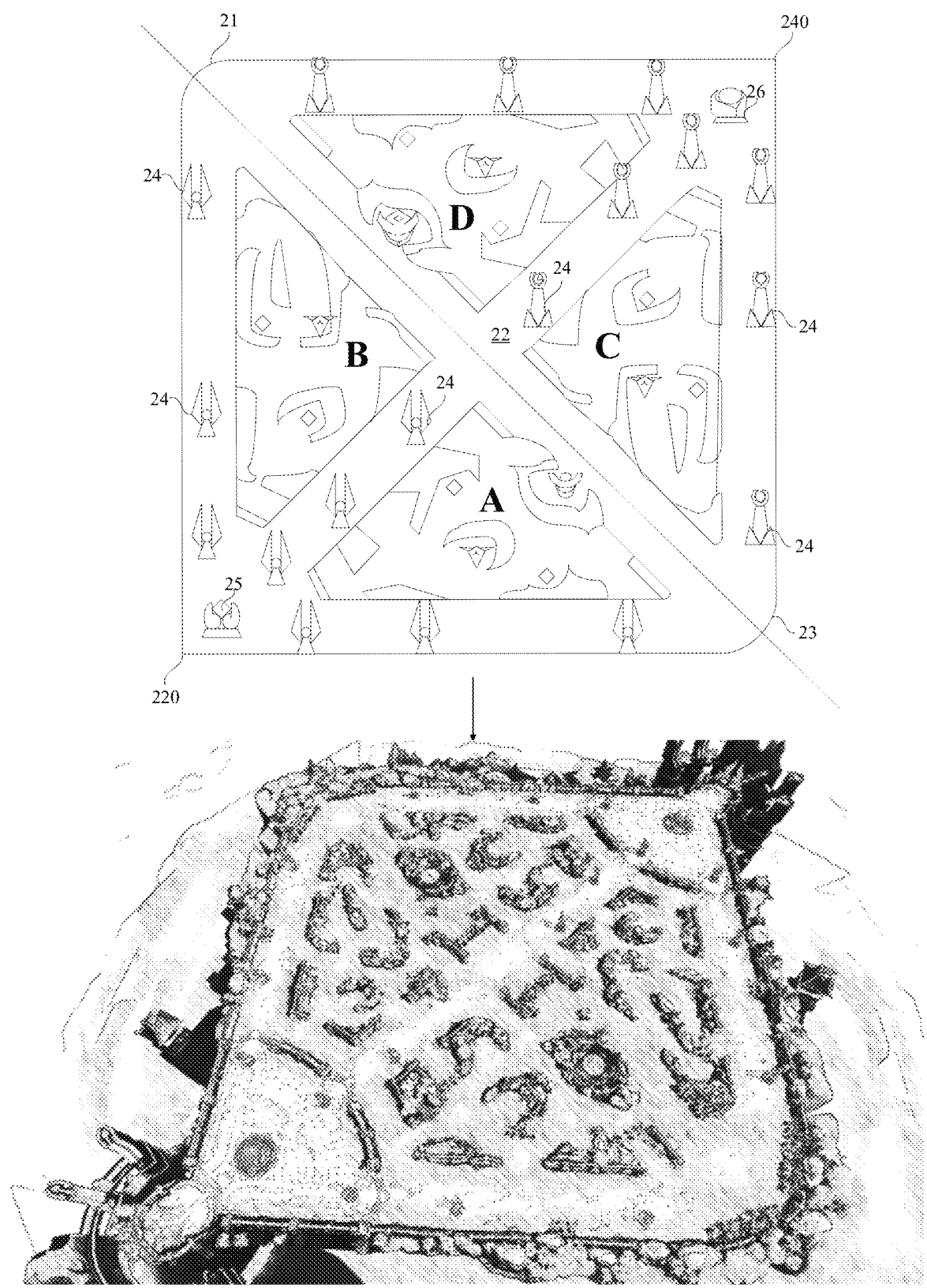
FIG. 2 is a schematic diagram of a map provided in a virtual scene of a MOBA game according to an embodiment of this application.

FIG. 2 is a schematic diagram of a map provided in a virtual scene of a MOBA game according to an embodiment of this application. The map 200 is square. The map 200 is divided diagonally into a lower left triangle region 220 and an upper right triangle region 240. There are three lanes from a lower left corner of the lower left triangle region 220 to an upper right corner of the upper right triangle region 240: a top lane 21, a middle lane 22, and a bottom lane 23. In a typical round of battle, 10 virtual roles are required to be divided into two camps to battle. 5 virtual roles in a first camp occupy the lower left triangle region 220, and 5 virtual roles in a second camp occupy the upper right triangle region 240. The first camp requires the destruction or occupation of all forts of the second camp as a victory condition, and the second camp requires the destruction or occupation of all forts of the first camp as a victory condition.

For example, the forts of the first camp include 9 turrets 24 and a first base 25. In the 9 turrets 24, there are respectively 3 turrets on the top lane 21, the middle lane 22, and the bottom lane 23. The first base 25 is located at the lower left corner of the lower left triangle region 220.

For example, the forts of the second camp include 9 turrets 24 and a second base 26. In the 9 turrets 24, there are respectively 3 turrets on the top lane 21, the middle lane 22, and the bottom lane 23. The second base 26 is located at the upper right corner of the upper right triangle region 240.

A position of a dotted line in FIG. 2 may be referred to as the riverway region. The riverway region is a common region of the first camp and the second camp, and is also a border region of the lower left triangle region 220 and the upper right triangle region 240.

The MOBA game requires the virtual roles to obtain resources in the map to improve combat capabilities of the virtual roles. The resources are experience values, gold coins, or BUFF effects obtained by killing neutral virtual objects or hostile virtual objects.

The combat capabilities of the virtual roles include two parts: level and equipment. The level is obtained by using accumulated experience values, and the equipment is purchased by using accumulated gold coins. In a round of battle, there may be 10 virtual roles. The 10 virtual roles may be obtained by matching 10 user accounts online by a server. For example, the server matches 2, 6, or 10 user accounts online for competition in the same virtual world. The 2, 6, or 10 virtual roles are on two opposing camps. The two camps have the same quantity of corresponding virtual roles. For example, there are 5 virtual roles on each camp. Types of the 5 virtual roles may be a warrior role, an assassin role, a mage role, a support (or meat shield) role, and an archer role respectively.

The battle may take place in rounds. The same map or different maps may be used in different rounds of battle. Each camp includes one or more virtual roles, such as 1 virtual role, 3 virtual roles, or 5 virtual roles.

During a battle, the user may send path information to each virtual object on the same camp in a targeted manner, to command the virtual object on the same camp or provide the path information to the virtual object on the same camp, so as to strengthen the communication with each virtual object on the same camp during the battle and further achieve a final goal of gaining an advantage and winning the battle. During the battle, to enable each virtual object to send path information to other virtual objects on the same camp in a targeted manner and improve the accuracy of sending the path information, this application provides a solution for sending path information in a virtual scene, and displaying a path trajectory corresponding to the path information.

Figure 3:
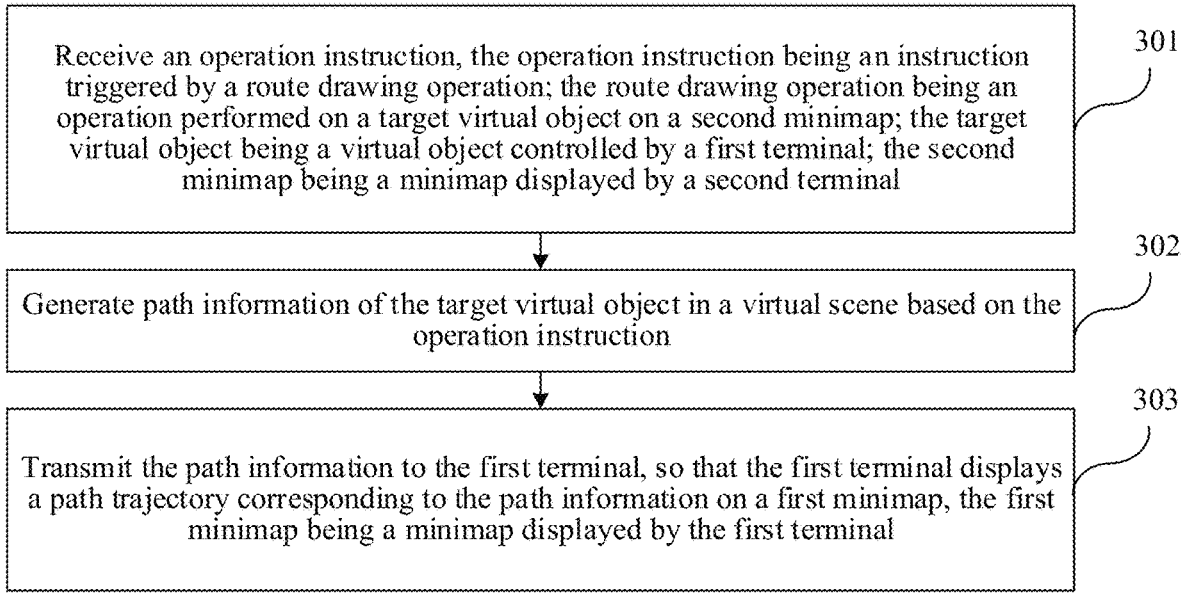
FIG. 3 is a flowchart of a data processing method in a virtual scene according to an embodiment of this application.

FIG. 3 is a flowchart of a data processing method in a virtual scene according to an embodiment of this application. The data processing method in a virtual scene may be performed by a computer device. The computer device may be a terminal or a server; or the computer device may include a terminal and a server. The terminal may be a second terminal configured to send path information. For example, the terminal may be the terminal in the system shown in FIG. 1. As shown in FIG. 3, the data processing method in a virtual scene may include the following steps:

Step 301. Receive an operation instruction, the operation instruction being an instruction triggered by a route drawing operation; the route drawing operation being an operation performed on a target virtual object on a second minimap; the target virtual object being a virtual object controlled by a first terminal; the second minimap being a minimap displayed by a second terminal.

In this embodiment, the computer device may receive an instruction triggered by the route drawing operation performed by the user on the target virtual object on the second minimap.

In one embodiment, the second terminal displays a path planning interface on a display screen, and the user performs the route drawing operation on the second minimap on the path planning interface, so that the computer device receives the operation instruction. The path planning interface includes the second minimap of a virtual scene.

The second minimap may be a map of the virtual scene scaled down according to a specified ratio.

Step 302. Generate path information of the target virtual object in a virtual scene based on the operation instruction.

In this embodiment, when the second terminal receives the route drawing operation performed on the target virtual object on the second minimap, the computer device receives the operation instruction, and the computer device may generate to-be-sent path information based on the operation instruction corresponding to the route drawing operation.

The target virtual object may be one of first virtual objects; and the first virtual object is a virtual object on the same camp as the virtual object controlled by the second terminal.

Step 303. Transmit the path information to the first terminal, so that the first terminal displays a path trajectory corresponding to the path information on a first minimap, the first minimap being a minimap displayed by the first terminal.

In this embodiment, the computer device may send the generated path information to the first terminal of the target virtual object, and when the first terminal receives the path information, the first terminal may display the path information in the first minimap on a first scene picture.

The first terminal may be a terminal that controls the target virtual object.

In summary, by performing the route drawing operation for the target virtual object in the second minimap, the operation instruction is triggered and path information is generated based on the operation instruction, and the path information is sent to the first terminal corresponding to the target virtual object, so that the first terminal may display the path trajectory corresponding to the path information in the first minimap. Therefore, corresponding path information may be separately generated for each virtual object, and is separately sent to the corresponding second terminal for display, thereby improving the effect of performing moving path prompting in the virtual scene.

Figure 4:
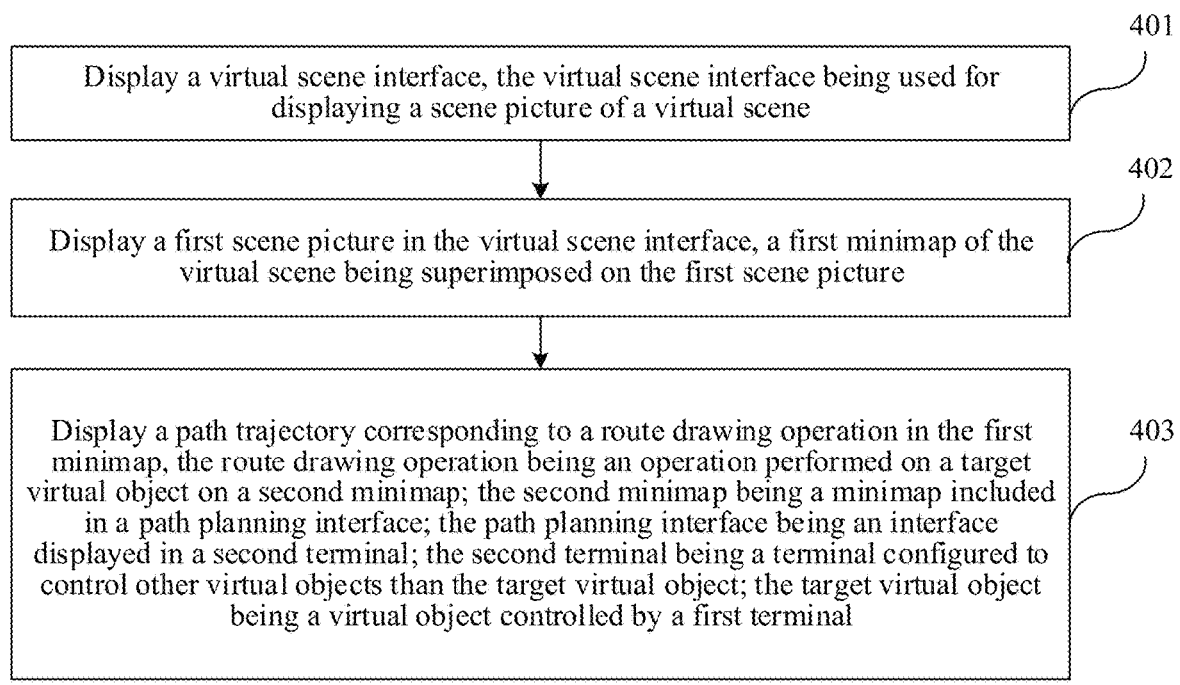
FIG. 4 is a flowchart of a data processing method in a virtual scene according to an embodiment of this application.

FIG. 4 is a flowchart of a data processing method in a virtual scene according to an embodiment of this application. The data processing method in a virtual scene may be performed by a terminal. The terminal may be a first terminal configured to receive path information. For example, the terminal may be the terminal in the system shown in FIG. 1. As shown in FIG. 4, the data processing method in a virtual scene may include the following steps:

Step 401. Display a virtual scene interface, the virtual scene interface being used for displaying a scene picture of a virtual scene.

In this embodiment, the first terminal may display the virtual scene interface, and the virtual scene interface may be used for displaying a virtual scene including a target virtual object.

For example, a game battle is used as an example. When a game is started, the terminal displays a virtual scene interface, and is configured to display a virtual scene from a control perspective of the terminal.

Step 402. Display a first scene picture in the virtual scene interface, a first minimap of the virtual scene being superimposed on the first scene picture.

In this embodiment, the first terminal may display the first scene picture in the virtual scene interface, a first minimap being superimposed on the first scene picture.

The first minimap is displayed in the first terminal, and is a map that corresponds to the virtual scene and is scaled down according to a specified ratio.

Step 403. Display a path trajectory corresponding to a route drawing operation on the first minimap, the route drawing operation being an operation performed on a target virtual object on a second minimap; the second minimap being a minimap included in a path planning interface; the path planning interface being an interface displayed in a second terminal; the second terminal being a terminal configured to control other virtual objects than the target virtual object; the target virtual object being a virtual object controlled by a first terminal.

In this embodiment, after receiving, through the first terminal, path information sent by the second terminal, the first terminal may display a path trajectory corresponding to the received path information in the first minimap, so that a user on a first terminal side may control, based on the received path information and the path trajectory displayed on a screen of the first terminal, the virtual object to move.

In summary, after the second minimap displayed on the second terminal receives the route drawing operation on the target virtual object, the first terminal may display the path trajectory corresponding to the route drawing operation, where the target virtual object is a virtual object controlled by the first terminal, the second terminal may separately generate the corresponding path trajectory for each virtual object based on the route drawing operation, and the corresponding path trajectory is separately displayed by the corresponding terminal. Similarly, the first terminal may alternatively receive path information sent by each second terminal, and separately display a path trajectory corresponding to each path information, thereby improving the effect of performing moving path prompting in the virtual scene.

Through the solution shown in the foregoing embodiment of this application, one user may separately plan different path information for different teammates in the virtual scene, to instruct different teammates to move separately according to respective paths. For example, a MOBA game scene is used as an example. During a game, a user may plan route information a for a teammate A to attack from the left, and plan route information b for a teammate B to attack from the right, a terminal of the user sends the route information a to a terminal of the teammate A, and sends the route information b to a terminal of the teammate B, the terminal of the teammate A displays the route information a on a minimap, and the terminal of the teammate B displays the route information b on a minimap. In this way, the teammate A and the teammate B see the respective route information on the respective minimaps, and control respective game roles respectively to move along different paths, to achieve the effect of separately indicating moving paths of a plurality of teammates, and improve the prompt effect of marking moving routes in the virtual scene.

Figure 5:
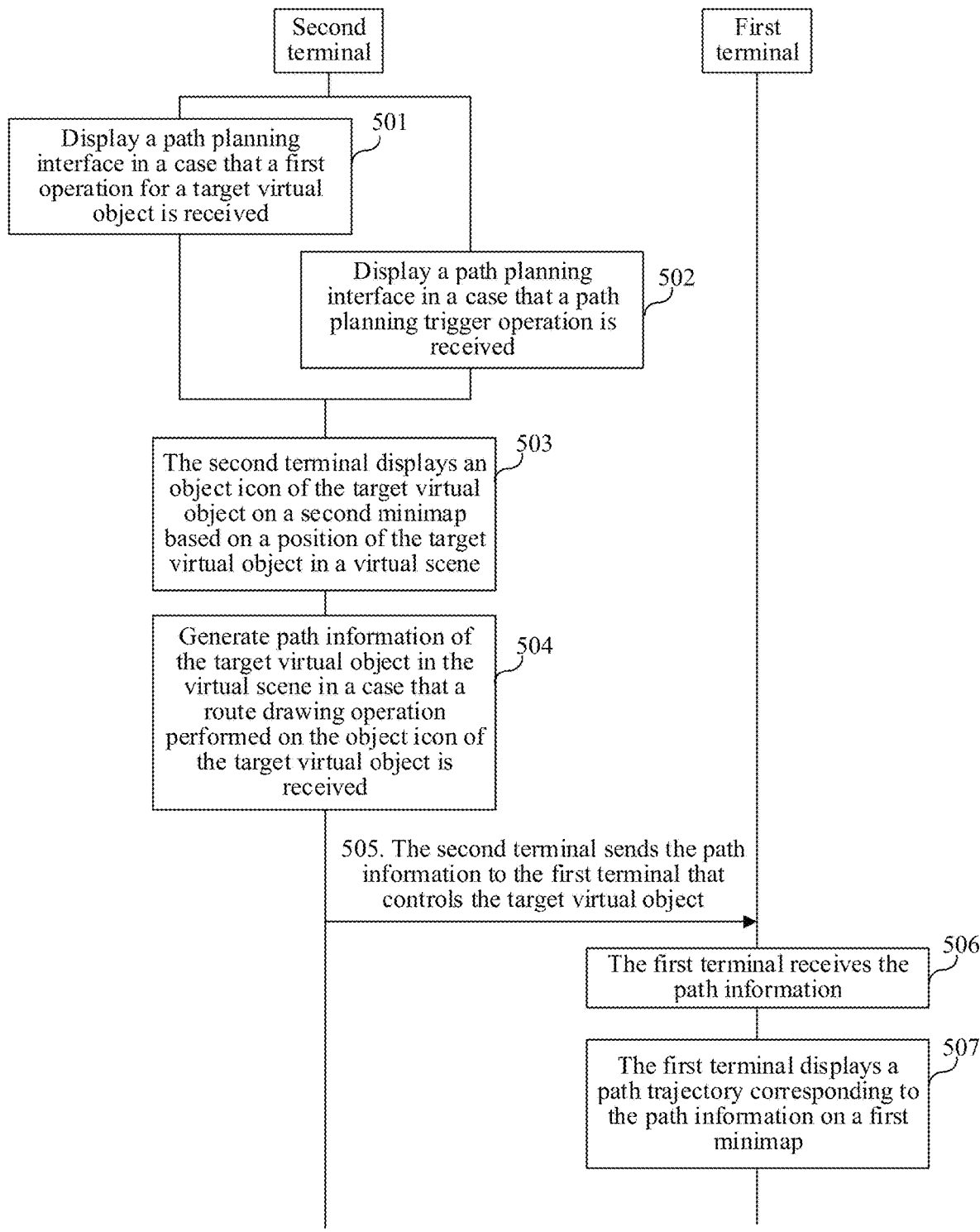
FIG. 5 is a flowchart of a data processing method in a virtual scene according to an embodiment of this application.

A game scene is used as an example to describe a process that virtual objects on the same camp send path information to each other during a battle. FIG. 5 is a flowchart of a data processing method in a virtual scene according to an embodiment of this application. For example, the data processing method in a virtual scene may be interactively performed by a first terminal, a server, and a second terminal. The first terminal and the second terminal may be the terminal in the system shown in FIG. 1, and the server may be the server in the system shown in FIG. 1. As shown in FIG. 5, the data processing method in a virtual scene may include the following steps:

Step 501. Display a path planning interface when a first operation for a target virtual object is received.

In this embodiment, when the second terminal receives the first operation on the target virtual object, the path planning interface for path planning is displayed in the second terminal, to subsequently perform a route drawing operation on the path planning interface.

The second terminal first determines the target virtual object from virtual objects on the same camp, and then receives the first operation on the target virtual object, and the path planning interface for path planning for prompting the target virtual object is displayed in the second terminal. The path planning interface includes a second minimap of a virtual scene, and the second minimap is a map corresponding to the virtual scene scaled down according to a specified ratio.

In one embodiment, the path planning interface is displayed in a case a signal trigger control corresponding to the target virtual object is superimposed on a first virtual scene picture displayed on the second terminal, and a trigger operation on the signal trigger control is received.

The signal trigger control is a control that displays information of the target virtual object, and is configured for the user to select the target virtual object, thereby reducing a probability of a wrong operation when the user selects the target virtual object.

For example, the signal trigger control may be a control having an avatar of the target virtual object, or the signal trigger control may be a control having an account name of the target virtual object.

The signal trigger control may be further configured to display a specified attribute value of the virtual object when being not triggered.

Figure 6:
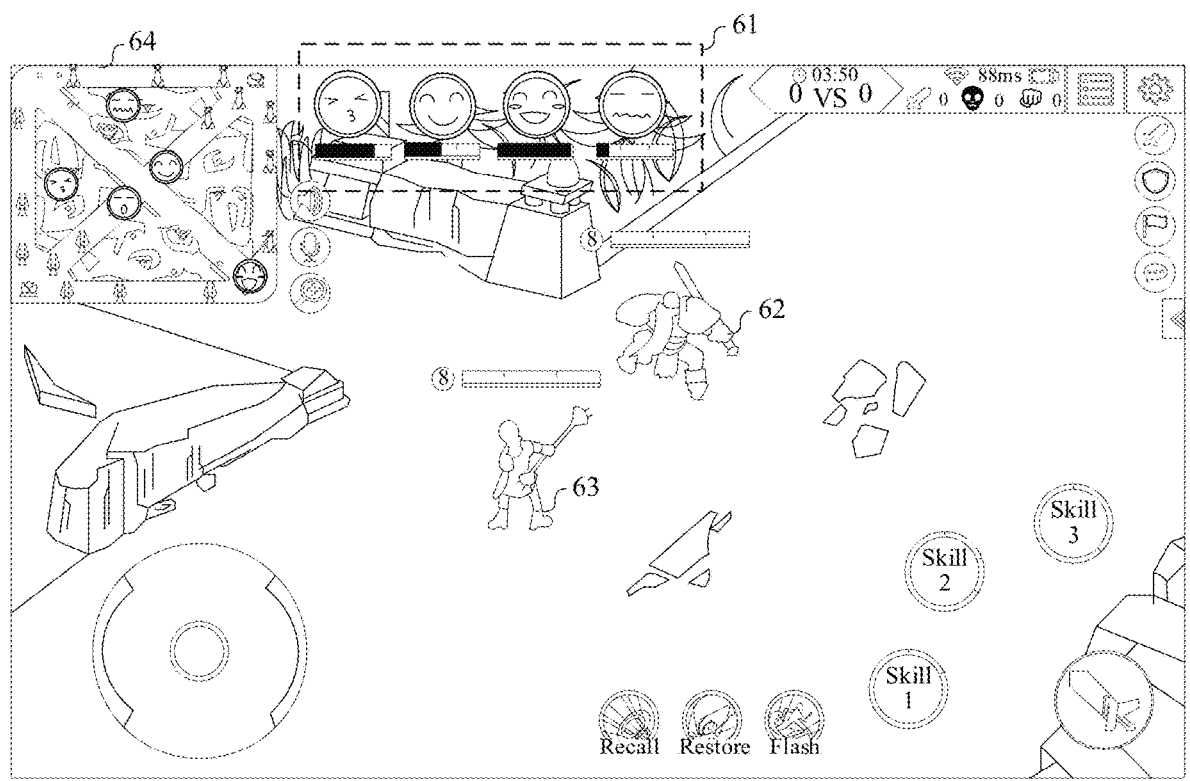
FIG. 6 is a schematic diagram of an initial state of a virtual scene picture in a second terminal involved in the embodiment shown in FIG. 5.

For example, FIG. 6 is a schematic diagram of an initial state of a virtual scene picture in a second terminal involved in an embodiment of this application. As shown in FIG. 6, when a virtual object 63 controlled by the second terminal and another virtual object 62 on the same camp are displayed in the virtual scene picture, an upper left corner of the virtual scene picture includes a minimap 64, positions of the master virtual object 63 and the another virtual object 62 on the same camp in the virtual scene may be displayed and are included in the minimap 64, and a right side of the minimap 64 includes an avatar control 61 corresponding to another virtual object on the same camp. The avatar control may display a specified attribute value of the current virtual object. The avatar control 61 may be a signal trigger control.

Figure 7:
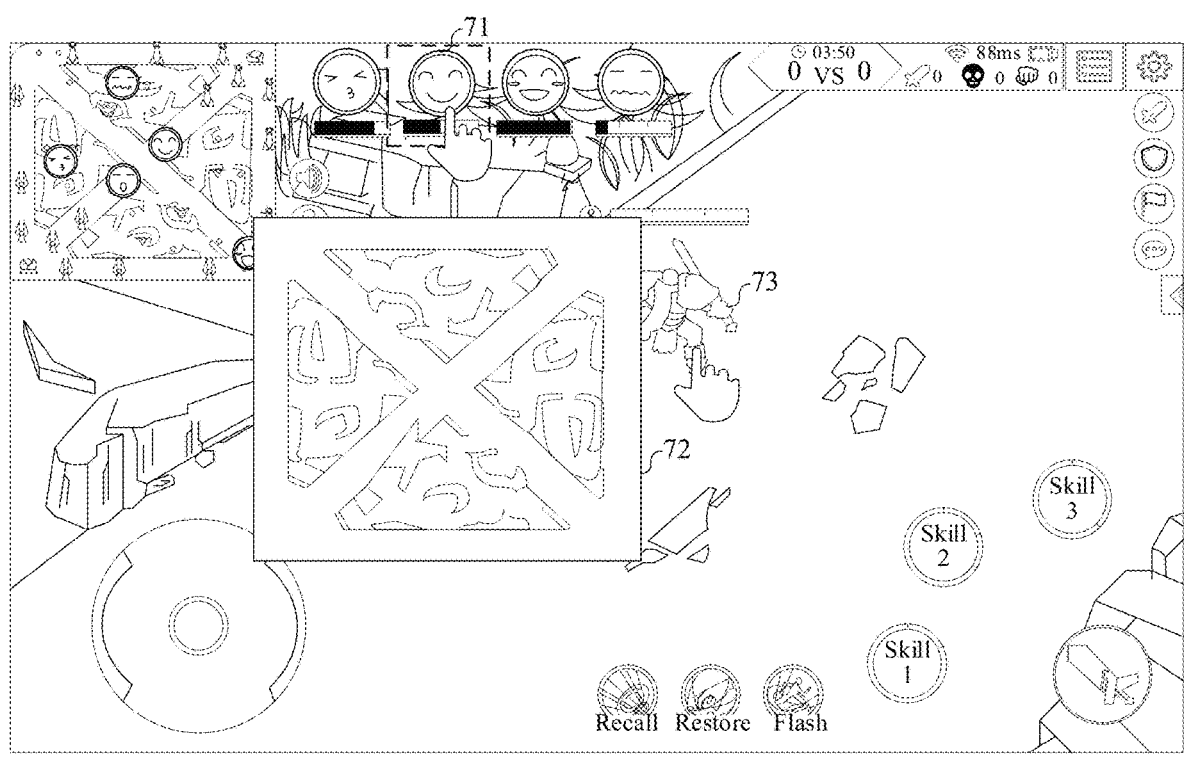
FIG. 7 is a schematic diagram of a path planning interface displayed on a second terminal involved in the embodiment shown in FIG. 5.

FIG. 7 is a schematic diagram of a path planning interface displayed on a second terminal involved in an embodiment of this application. As shown in FIG. 7, when the user performs a trigger operation on a signal trigger control 71, the second terminal displays the path planning interface. The path planning interface includes a second minimap 72. The second minimap 72 may include only a road region and an obstacle region in the virtual scene.

In another embodiment, the path planning interface is displayed when a trigger operation on the target virtual object in the virtual scene is received.

In the virtual scene, the virtual object controlled by the second terminal may determine positions of other virtual objects on the same camp in the virtual scene by adjusting a field of view, and when a trigger operation on a virtual object in the other virtual objects on the same camp is received, the second terminal may determine the virtual object as a target virtual object, and a path planning interface corresponding to the target virtual object is also displayed in the second terminal.

For example, as shown in FIG. 7, when the user performs a trigger operation on a first virtual object 73 (for example, double-clicks the first virtual object 73), a path planning interface may be displayed through the second terminal, where the path planning interface includes the second minimap 72. If the first virtual object 73 corresponds to the signal trigger control 71, by performing a trigger operation on the signal trigger control 71 and the first virtual object 73, obtained target virtual objects are both the first virtual object 73.

The first virtual object is a virtual object on the same camp as the virtual object controlled by the second terminal.

In one embodiment, a region corresponding to an obstacle in the virtual scene in the second minimap is a highlighted region.

Figure 8:
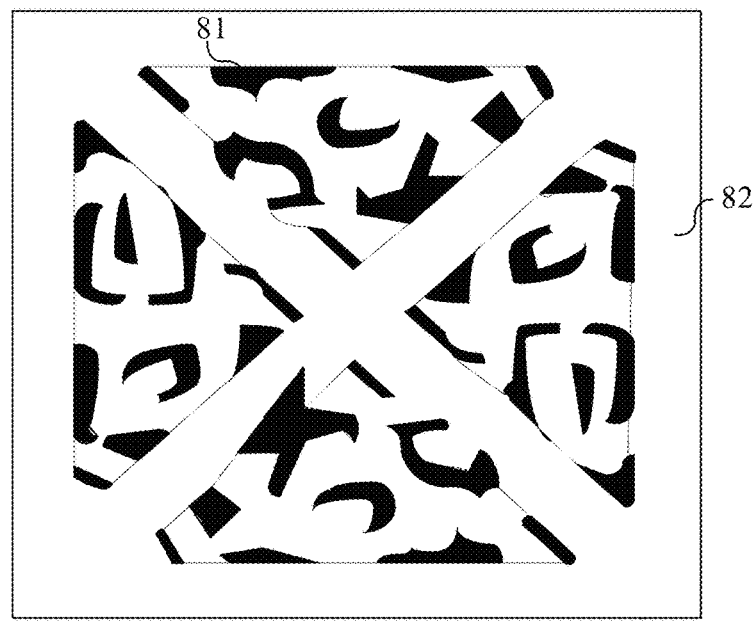
FIG. 8 is a schematic diagram corresponding to a second minimap involved in the embodiment shown in FIG. 5.

For example, FIG. 8 is a schematic diagram corresponding to a second minimap involved in an embodiment of this application. As shown in FIG. 8, the second minimap includes a road region 81 and an obstacle region 82. The road region 81 corresponds to a road in the virtual scene, and the virtual object may move in the region. The obstacle region 82 corresponds to an obstacle in the virtual scene, and is a region in which the virtual object is forbidden to pass through. In addition, in the second minimap, the road region 81 is displayed normally, and the obstacle region 82 is highlighted to prompt that the user avoids the obstacle region 82 as much as possible during path drawing.

In one embodiment, the second minimap includes object icons of the first virtual objects.

The object icons of the first virtual objects may be displayed with a highlight in the second minimap.

Step 502. Display a path planning interface when a path planning trigger operation is received.

In this embodiment, when the path planning trigger operation is received, the path planning interface is displayed in the second terminal, and a target virtual object is not determined in this case.

In one embodiment, the path planning trigger operation includes a click operation on the second minimap in the second terminal, or a click operation on a first trigger control other than the second minimap.

When the second terminal is displaying a virtual scene picture, if the second terminal receives the click operation performed by the user on the second minimap, the second minimap may be displayed on a display screen of the second terminal after being enlarged according to a specified ratio, the path planning interface enters, and the user may start to select a target virtual object. Alternatively, if the second terminal receives the click operation on the first trigger control configured to open the path planning interface, the second minimap may also be displayed on a display screen of the second terminal after being enlarged according to a specified ratio, the path planning interfaces, and the user may start to select a target virtual object.

Step 503. The second terminal displays an object icon of the target virtual object on a second minimap based on a position of the target virtual object in a virtual scene.

In this embodiment, the second terminal may display the object icon of the target virtual object on the second minimap based on the position of the selected target virtual object in the virtual scene.

The target virtual object is one of first virtual objects. The object icon of the target virtual object may be an avatar of the target virtual object or a nickname information bar of the target virtual object.

In one embodiment, the object icon of the target virtual object is used for indicating a starting position of the route drawing operation.

Step 504. Generate path information of the target virtual object in the virtual scene when a route drawing operation performed on the object icon of the target virtual object is received.

In this embodiment, when the second terminal receives the route drawing operation performed on the object icon of the target virtual object, the second terminal or the server or the second terminal and the server together generate the path information of the target virtual object in the virtual scene according to a trajectory drawn through the route drawing operation.

In one embodiment, when the second minimap includes the object icons corresponding to the first virtual objects, the route drawing operation is performed based on a received trigger operation on one of the object icons, and the first virtual object corresponding to the object icon is determined as the target virtual object. Then, path information of the target virtual object in the virtual scene is generated when the second terminal receives the route drawing operation on the object icon corresponding to the target virtual object.

When the second minimap does not include the object icons corresponding to the first virtual objects, after a first virtual object is selected as the target virtual object based on the trigger operation, an object icon of the target virtual object may be generated in the second minimap. Then, path information of the target virtual object in the virtual scene is generated when the second terminal receives the route drawing operation on the object icon corresponding to the target virtual object.

Alternatively, when the second minimap does not include the object icons corresponding to the first virtual objects, after a first virtual object is selected as the target virtual object based on the trigger operation, the route drawing operation may alternatively be directly performed in the second minimap, to generate path information of the target virtual object in the virtual scene.

In one embodiment, when a sliding operation started from a first object icon in the second minimap is received, a first virtual object corresponding to the first object icon is determined as the target virtual object, and path information of the target virtual object in the virtual scene is then generated based on the sliding operation.

In the foregoing solution, if the user does not release the first object icon after pressing the first object icon and continues to perform the sliding operation, the first virtual object corresponding to the pressed first object icon is the foregoing target virtual object, and a position of the first object icon is a starting sliding position of the route drawing operation. When the sliding operation is released, the second terminal may generate the path information of the target virtual object in the virtual scene according to a sliding route of the sliding operation. Correspondingly, a starting position of a path indicated by the path information is the position of the first object icon.

In another embodiment, when a click operation on a first object icon in the second minimap is received, a first virtual object corresponding to the first object icon is determined as the target virtual object, and in response to the received sliding operation on the second minimap, path information of the target virtual object in the virtual scene is generated based on the sliding operation.

In the foregoing solution, if the user releases the first object icon after pressing the first object icon, the first virtual object corresponding to the pressed first object icon is the foregoing target virtual object. After that, when the user performs the sliding operation on the first minimap, the second terminal may generate the path information of the target virtual object in the virtual scene according to a sliding route of the sliding operation. In this case, a starting position of the sliding operation may be a position of the first object icon, or another position other than the first object icon.

Figure 9:
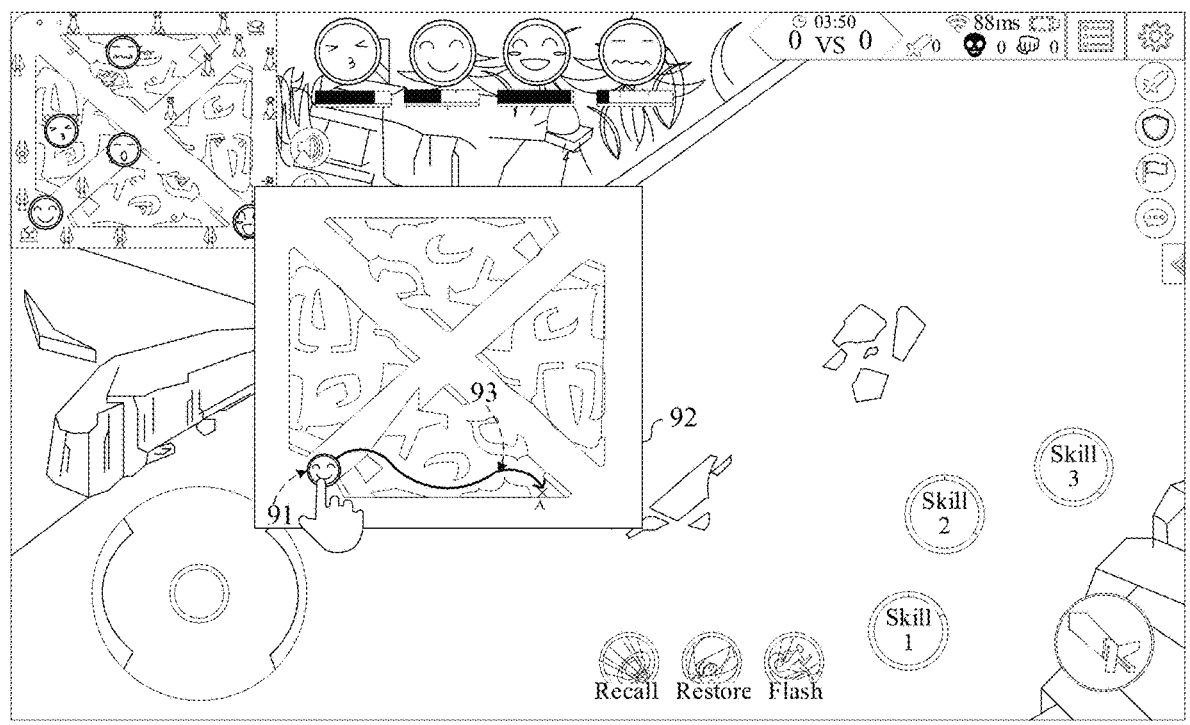
FIG. 9 is a schematic diagram of generating path information involved in the embodiment shown in FIG. 5.

For example, FIG. 9 is a schematic diagram of generating path information involved in an embodiment of this application. As shown in FIG. 9, an object icon 91 of a first virtual object is displayed on a second minimap 92. When the second terminal receives a sliding operation started from the object icon 91, the object icon 91 is determined as the object icon 91 of a target virtual object, a path from the object icon 91 to a point A may be drawn through the sliding operation, and the path may be obtained as path information 93 of the target virtual object in the virtual scene. Alternatively, when an object icon 91 in a second minimap 92 receives a click operation of the user, the object icon 91 may be determined as the object icon 91 corresponding to a target virtual object, and path information 93 of the target virtual object in the virtual scene may also be generated based on a sliding operation performed after the click operation.

Step 505. The second terminal sends the path information to a first terminal that controls the target virtual object.

In this embodiment, the second terminal may send the path information to the first terminal that controls the target virtual object.

In one embodiment, the path information is sent in the form of coordinate points, or the path information is sent in the form of an image.

If the path information is sent in the form of coordinate points, the second terminal converts the generated path information into each coordinate point, and sends each coordinate point to the corresponding first terminal through the server. If the path information is sent in the form of an image, the second terminal send a video or picture content corresponding to the generated path information to the first terminal through the server.

In one embodiment, in a second minimap of a path planning interface, by performing a route drawing operation on object icons of a plurality of first virtual objects, corresponding path information is separately sent to a second terminal corresponding to each first virtual object.

When a sliding operation started from each first object icon in the second minimap is received, path information of each first virtual object in the virtual scene is generated based on the sliding operation, and by performing a trigger operation on a specified trigger control, each path information is sent to a corresponding first terminal; or when a segment of sliding operation is completed, path information drawn through the segment of sliding operation is sent to a corresponding first terminal.

Figure 10:
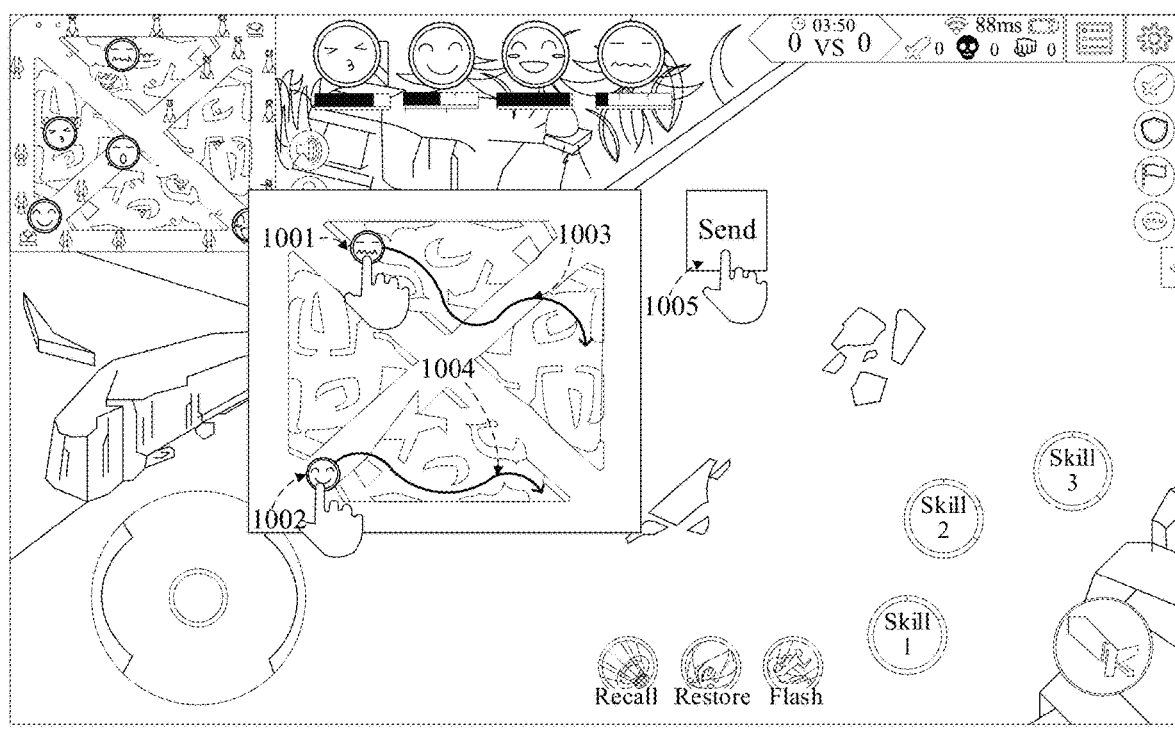
FIG. 10 is a schematic diagram of sending path information to a plurality of target virtual objects involved in the embodiment shown in FIG. 5.

FIG. 10 is a schematic diagram of sending path information to a plurality of target virtual objects involved in an embodiment of this application. As shown in FIG. 10, when a sliding operation on an object icon 1001 and an object icon 1002 corresponding to first virtual objects in a second minimap is received, path information 1003 and path information 1004 are separately generated. When receiving a trigger operation on a first trigger control 1005, the second terminal sends the path information 1003 to a second terminal corresponding to the object icon 1001, and sends the path information 1004 to a second terminal corresponding to the object icon 1002.

In one embodiment, the first terminal displays a path trajectory corresponding to the received path information on a first minimap, the first minimap being a minimap superposed on the virtual scene interface and displayed by the first terminal.

Step 506. The first terminal receives the path information.

In this embodiment, the first terminal may receive the path information sent from the second terminal.

The path information is generated in response to a route drawing operation performed on a target virtual object on the second minimap.

The first terminal may display a first scene interface, a first minimap is superposed on the first scene interface, and the first scene interface further includes a virtual scene picture.

In one embodiment, when the first terminal receives the path information sent from the second terminal, the path information is preferentially stored in a buffer region.

Step 507. The first terminal displays a path trajectory corresponding to the path information on a first minimap.

In this embodiment, after receiving the path information, the first terminal may display the path trajectory obtained according to the received path information on the first minimap.

If the received path information is coordinate information of the path trajectory, a corresponding path trajectory is generated on the second minimap according to the coordinate information of the path trajectory. If image information corresponding to the path trajectory is received, image replacement is directly performed on a path region in the second minimap to display the path trajectory.

In one embodiment, path prompt information is displayed on a first scene picture, and the path trajectory corresponding to the path information is displayed on the first minimap through the first terminal when a confirmation operation for the path prompt information is received.

The path prompt information may be used for indicating that there is path information sent by the second terminal in the first terminal.

That is, when the first terminal receives the path information sent by the second terminal, the path prompt information may be displayed on the first scene picture of the first terminal, and the path prompt information may be displayed in the form of a pop-up window. A user on the first terminal side may determine whether to display the path trajectory corresponding to the path information. When the first terminal receives the confirmation operation for the path prompt information, the path trajectory corresponding to the path information is generated, and is displayed on the first minimap.

In one embodiment, the path prompt information includes avatar information or account name information of a virtual object corresponding to the second terminal.

For example, when the first terminal receives the path prompt information, identity information corresponding to a virtual object that sends the path information may be displayed in the first scene picture, and the user on the first terminal side my determine whether to view the path information sent by the player.

In one embodiment, after the path information is received, based on a specified ratio between the first minimap and the virtual scene, the path trajectory corresponding to the path information is displayed in the virtual scene in the form of an indication icon.

Figure 11:
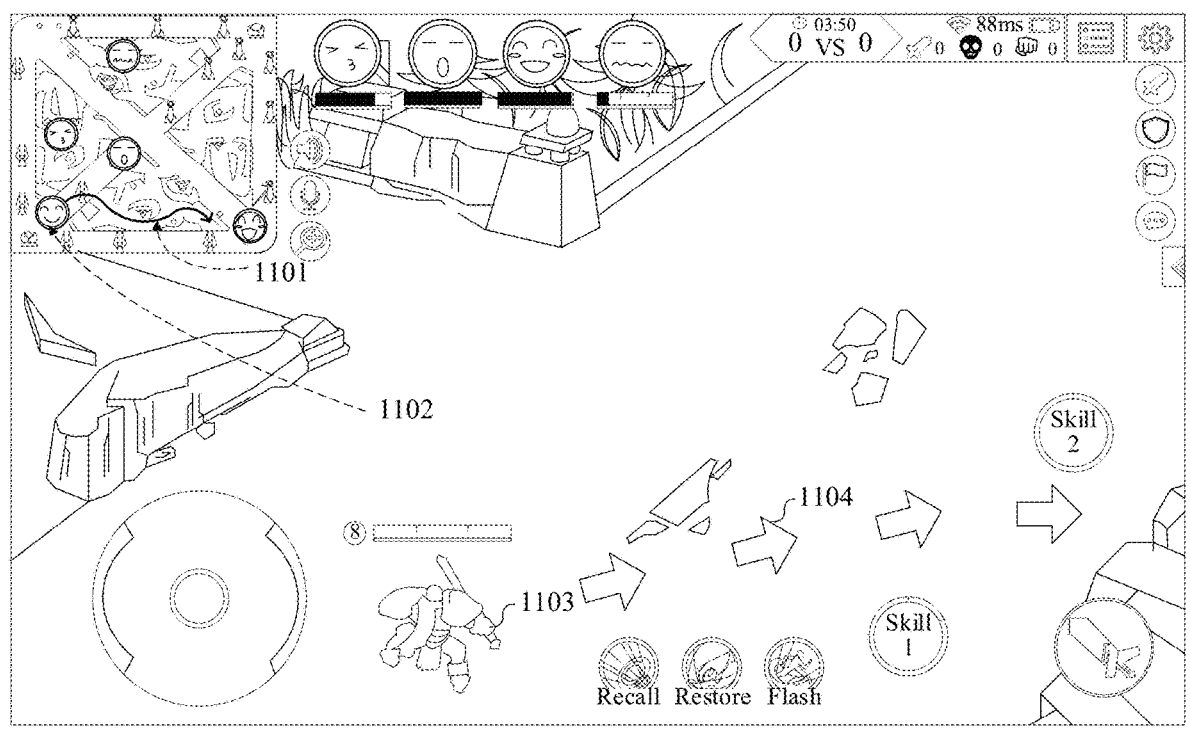
FIG. 11 is a schematic diagram that a first terminal displays a path trajectory of path information involved in the embodiment shown in FIG. 5.

For example, FIG. 11 is a schematic diagram that a first terminal displays a path trajectory corresponding to path information involved in an embodiment of this application. As shown in FIG. 11, based on the received path information, the first terminal may display a path trajectory 1101 corresponding to path information on a first minimap in a first scene picture, and an object icon corresponding to a virtual object 1103 mainly controlled by the first terminal is an object icon 1102 in the first minimap. Based on the path trajectory 1101, a corresponding indication icon 1104 may be generated in the virtual scene, and is used for indicating that the virtual object 1103 moves along the path trajectory 1101.

In summary, by performing the route drawing operation for the target virtual object in the second minimap, the operation instruction is triggered and path information is generated based on the operation instruction, and the path information is sent to the first terminal corresponding to the target virtual object, so that the first terminal may display the path trajectory corresponding to the path information in the first minimap. Therefore, corresponding path information may be separately generated for each virtual object, and is separately sent to the corresponding second terminal for display, thereby improving the effect of performing moving path prompting in the virtual scene.

Figure 12:
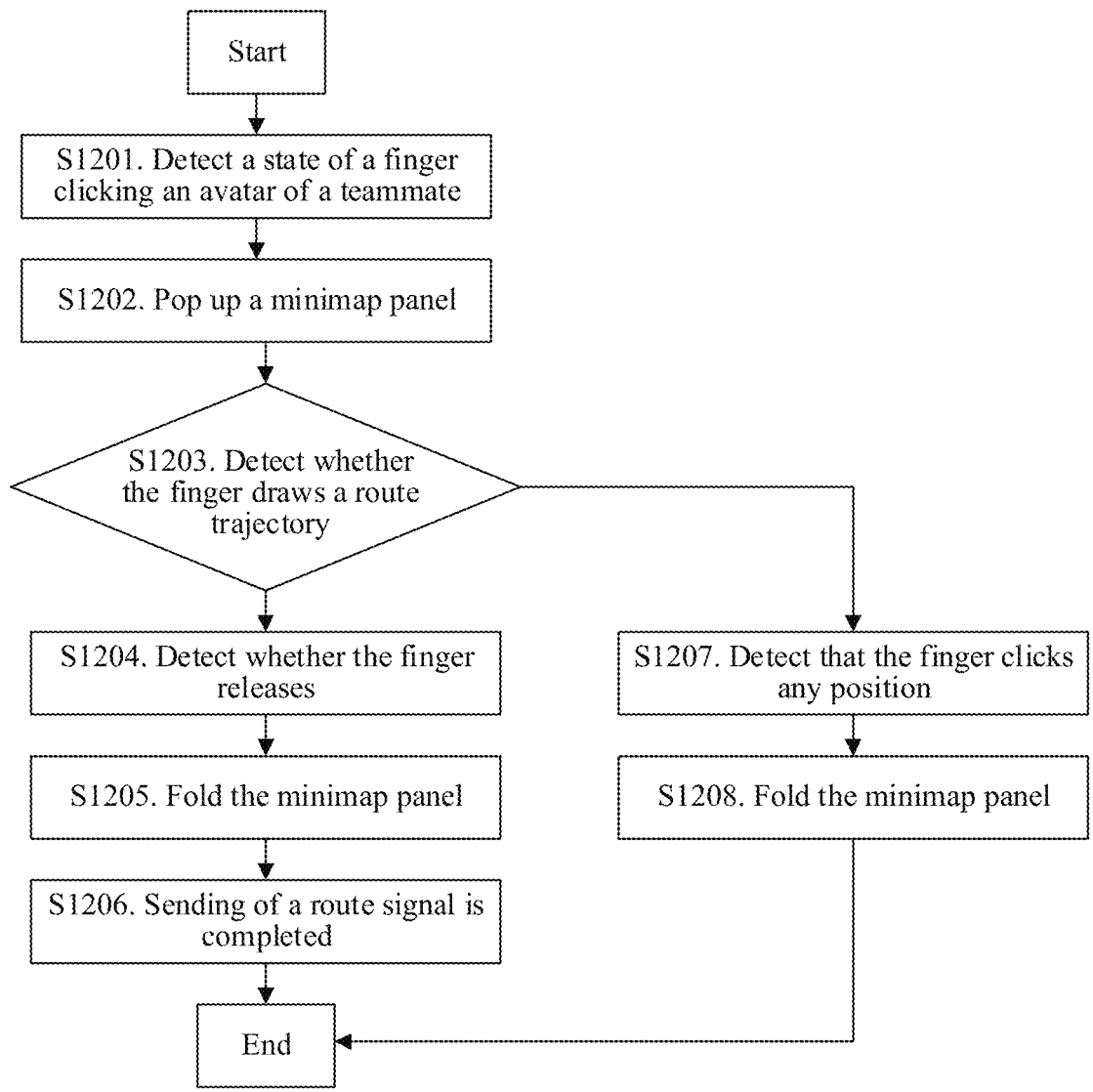
FIG. 12 is a diagram of a logic procedure of sending a path signal according to an embodiment of this application.

An example in which the first terminal and the second terminal are mobile terminals with touchscreens is used. FIG. 12 is a diagram of a logic procedure of sending a path signal according to an embodiment of this application. As shown in FIG. 12, the logic procedure may include the following steps:

S1201. A second terminal detects that an avatar corresponding to a virtual object on the same camp receives a click operation.

S1202. The second terminal pops up a minimap panel (a second minimap) in a path planning interface.

S1203. Determine whether a finger on a second terminal side draws a route trajectory on the minimap panel.

S1204. If it is determined that the finger draws the route trajectory on the minimap panel of the second terminal, detect whether the finger releases, that is, the finger that draws a route leaves a touchscreen of the second terminal.

S1205. If the finger that draws the route leaves the touchscreen of the second terminal, the second terminal folds the minimap panel.

S1206. Send a signal of the drawn route to a first terminal.

S1207. If it is determined that the finger does not draw the route trajectory on the minimap panel of the second terminal, detect whether the finger clicks any position on the touchscreen.

S1208. When it is detected that the finger clicks on any position on the touchscreen, fold the minimap panel, and end sending of the path signal.

In summary, by performing the route drawing operation for the target virtual object in the second minimap, the operation instruction is triggered and path information is generated based on the operation instruction, and the path information is sent to the first terminal corresponding to the target virtual object, so that the first terminal may display the path trajectory corresponding to the path information in the first minimap. Therefore, corresponding path information may be separately generated for each virtual object, and is separately sent to the corresponding second terminal for display, thereby improving the effect of performing moving path prompting in the virtual scene.

Figure 13:
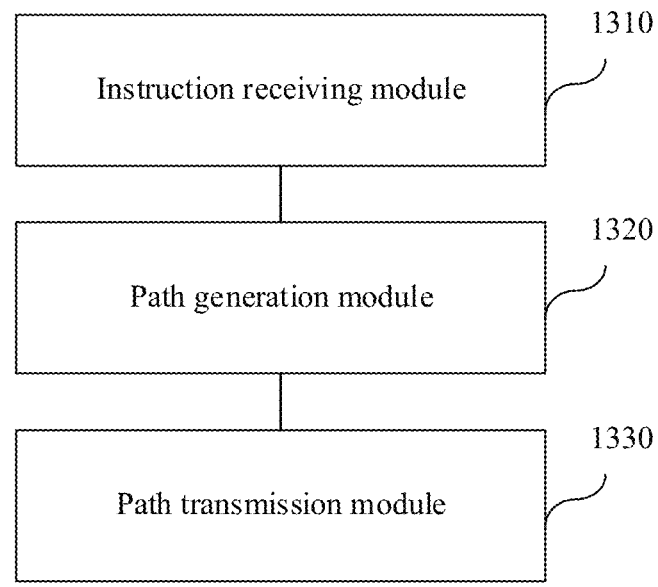
FIG. 13 is a structural block diagram of a data processing apparatus in a virtual scene according to an embodiment of this application.

FIG. 13 is a structural block diagram of a data processing apparatus in a virtual scene according to an embodiment of this application. The data processing apparatus in a virtual scene may be configured to perform the method shown in the embodiment corresponding to FIG. 3 or FIG. 5. The data processing apparatus in a virtual scene may include:

an instruction receiving module 1310, configured to receive an operation instruction, the operation instruction being an instruction triggered by a route drawing operation; the route drawing operation being an operation performed on a target virtual object on a second minimap; the target virtual object being a virtual object controlled by a first terminal; the second minimap being a minimap displayed by a second terminal;

a path generation module 1320, configured to generate path information of the target virtual object in a virtual scene based on the operation instruction; and a path transmission module 1330, configured to transmit the path information to the first terminal, so that the first terminal displays a path trajectory corresponding to the path information on a first minimap, the first minimap being a minimap displayed by the first terminal.

In one embodiment, when the computer device is the second terminal, the apparatus further includes:

an interface display module, configured to display a path planning interface on a screen of the second terminal before an operation instruction is received, the path planning interface including the second minimap.

In one embodiment, the interface display module includes:

a first interface display submodule, configured to display the path planning interface when a first operation for the target virtual object is received.

In one embodiment, the first interface display submodule includes:

a first display unit, configured to display the path planning interface in a case a signal trigger control corresponding to the target virtual object is superimposed on a first virtual scene picture displayed on the second terminal, and a trigger operation on the signal trigger control is received, the signal trigger control being a control that displays information of the target virtual object.

In one embodiment, the first interface display submodule includes:

a second display unit, configured to display the path planning interface when a trigger operation on the target virtual object in the virtual scene is received.

In one embodiment, the apparatus further includes:

an icon display submodule, configured to display an object icon of the target virtual object on the second minimap based on a position of the target virtual object in the virtual scene.

In one embodiment, the interface display module includes:

a display submodule, configured to display the path planning interface when a path planning trigger operation is received, the path planning trigger operation including a click operation on the second minimap, or a click operation on a first trigger control other than the second minimap.

In one embodiment, the target virtual object is one of first virtual objects, the first virtual object being a virtual object on the same camp as the virtual object controlled by the first terminal; object icons of the first virtual objects being displayed on the second minimap; and the route drawing operation being an operation performed on the object icon of the target virtual object.

In one embodiment, the route drawing operation includes a sliding operation started from a first object icon in the second minimap; and the path generation module 1320 includes:

a first target determining submodule, configured to determine the first virtual object corresponding to the first object icon as the target virtual object based on the operation instruction;

and a first path generation submodule, configured to generate the path information of the target virtual object in the virtual scene based on the sliding operation.

In one embodiment, the route drawing operation includes a click operation on a first object icon in the second minimap, and a sliding operation on the second minimap; and the path generation module 1320 includes:

a second target determining unit, configured to determine the first virtual object corresponding to the first object icon as the target virtual object based on the operation instruction; and a second path generation unit, configured to generate the path information of the target virtual object in the virtual scene based on the sliding operation.

In one embodiment, the apparatus further includes: an icon display module, configured to display the object icons of the first virtual objects with a highlight in the second minimap before path information of the target virtual object in a virtual scene is generated based on the operation instruction.

In one embodiment, the second minimap includes a highlighted region, the highlighted region being a region corresponding to an obstacle in the virtual scene in the second minimap.

In summary, by performing the route drawing operation for the target virtual object in the second minimap, the operation instruction is triggered and path information is generated based on the operation instruction, and the path information is sent to the first terminal corresponding to the target virtual object, so that the first terminal may display the path trajectory corresponding to the path information in the first minimap. Therefore, corresponding path information may be separately generated for each virtual object, and is separately sent to the corresponding second terminal for display, thereby improving the effect of performing moving path prompting in the virtual scene.

Figure 14:
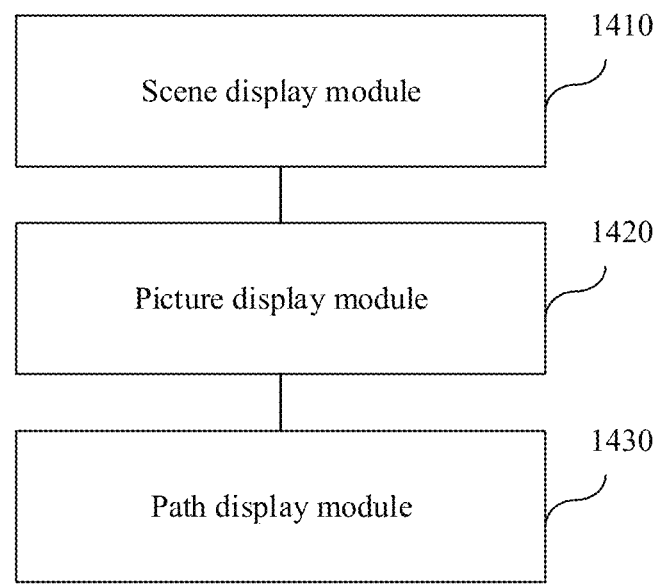
FIG. 14 is a structural block diagram of a data processing apparatus in a virtual scene according to an embodiment of this application.

FIG. 14 is a structural block diagram of a data processing apparatus in a virtual scene according to an embodiment of this application. The data processing apparatus in a virtual scene may be configured to perform all or some steps in the method shown in the embodiment corresponding to FIG. 4 or FIG. 5. The data processing apparatus in a virtual scene may include:

- a scene display module 1410, configured to display a virtual scene interface, the virtual scene interface being used for displaying a scene picture of a virtual scene;
- a picture display module 1420, configured to display a first scene picture in the virtual scene interface, a first minimap of the virtual scene being superimposed on the first scene picture; and
- a path display module 1430, configured to display a path trajectory corresponding to a route drawing operation on the first minimap, the route drawing operation being an operation performed on a target virtual object on a second minimap; the second minimap being a minimap included in a path planning interface; the path planning interface being an interface displayed in a second terminal; the second terminal being a terminal configured to control other virtual objects than the target virtual object; the target virtual object being a virtual object controlled by the first terminal.

In one embodiment, the path display module 1430 includes:

- a prompt display submodule, configured to display path prompt information on the first scene picture, the path prompt information being information used for prompting the first terminal after the second terminal receives the route drawing operation; and
- a path display submodule, configured to display the path trajectory on the first minimap when a confirmation operation for the path prompt information is received.

In summary, after the second minimap displayed on the second terminal receives the route drawing operation on the target virtual object, the first terminal may display the path trajectory corresponding to the route drawing operation, where the target virtual object is a virtual object controlled by the first terminal, the second terminal may separately generate the corresponding path trajectory for each virtual object based on the route drawing operation, and the corresponding path trajectory is separately displayed by the corresponding terminal. Similarly, the first terminal may alternatively receive path information sent by each second terminal, and separately display a path trajectory corresponding to each path information, thereby improving the effect of performing moving path prompting in the virtual scene.

Figure 15:
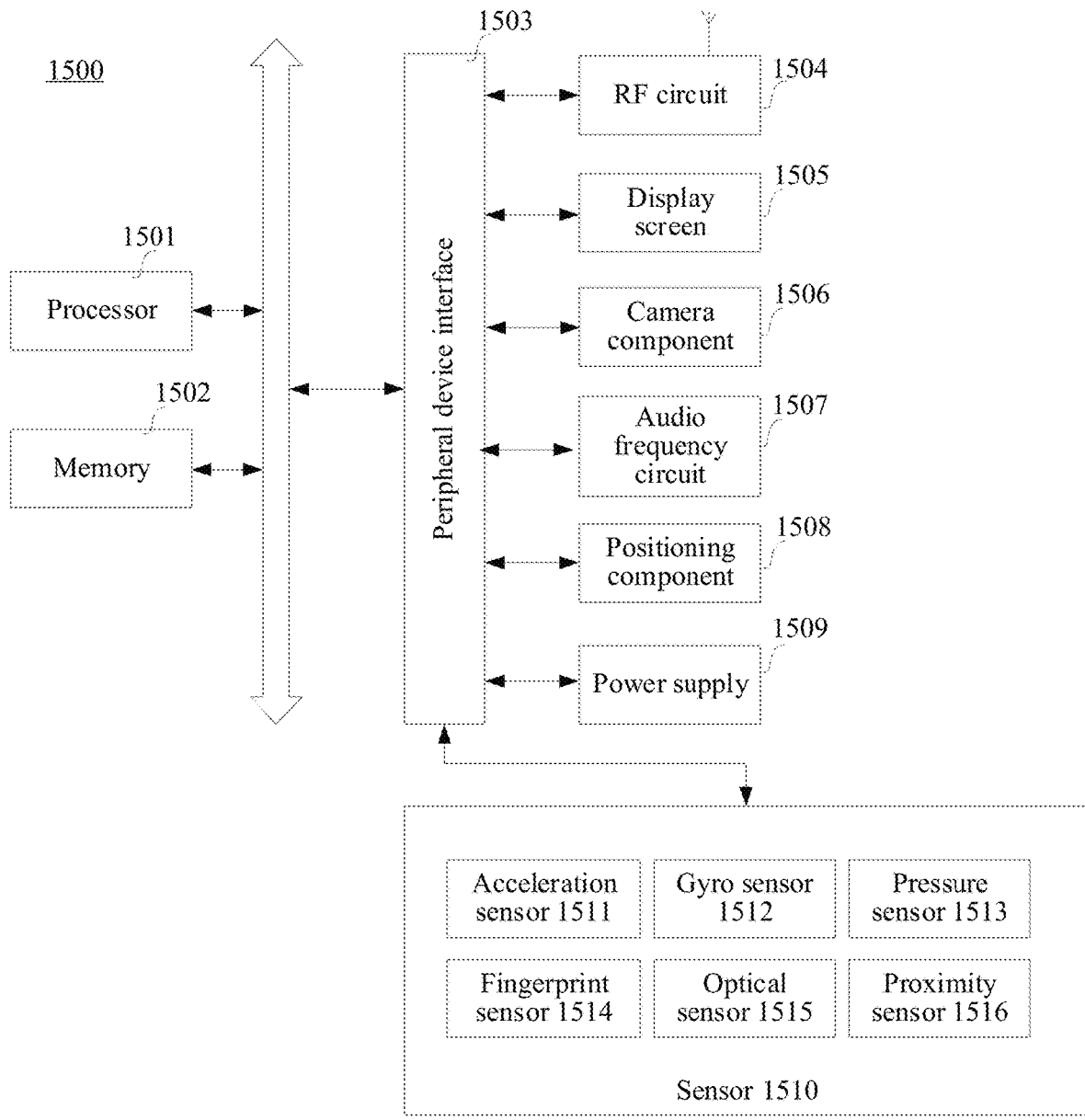
FIG. 15 is a structural block diagram of a computer device according to an embodiment of this application.

FIG. 15 is a structural block diagram of a computer device 1500 according to an embodiment. The computer device 1500 may be a user terminal, such as a smartphone, a tablet computer, an MP3 player, an MP4 player, a notebook computer, or a desktop computer. The computer device 1500 may also be referred to as another name such as user equipment, a portable terminal, a laptop terminal, or a desktop terminal.

Generally, the computer device 1500 includes a processor 1501 and a memory 1502.

In some embodiments, the computer device 1500 further includes a peripheral device interface 1503 and at least one peripheral device. The processor 1501, the memory 1502, and the peripheral device interface 1503 may be connected through a bus or a signal cable. Each peripheral device may be connected to the peripheral device interface 1503 through a bus, a signal cable, or a circuit board. Specifically, the peripheral device includes: at least one of a radio frequency (RF) circuit 1504, a display screen 1505, a camera component 1506, an audio circuit 1507, a positioning component 1508, and a power supply 1509.

The display screen 1505 is configured to display a UI. The UI may include a graph, a text, an icon, a video, and any combination thereof. When the display screen 1505 is a touchscreen, the display screen 1505 is further capable of acquiring a touch signal on or above a surface of the display screen 1505. The touch signal may be inputted into the processor 1501 as a control signal for processing.

In some embodiments, the computer device 1500 may further include one or more sensors 1510. The one or more sensors 1510 include, but are not limited to: an acceleration sensor 1511, a gyro sensor 1512, a pressure sensor 1513, a fingerprint sensor 1514, an optical sensor 1515, and a proximity sensor 1516.

A person skilled in the art may understand that the structure shown in FIG. 15 does not constitute a limitation on the computer device 1500, and the computer device may include more or fewer components than those shown in the figure, or some components may be combined, or a different component deployment may be used.

In an embodiment, a non-temporary computer-readable storage medium including instructions is further provided. For example, the non-temporary computer-readable storage medium includes at least one instruction, at least one program, a code set, or an instruction set. The at least one instruction, the at least one program, the code set, or the instruction set may be executed by a processor to implement all or some steps in the method shown in the embodiment corresponding to FIG. 3, FIG. 4, or FIG. 5.

According to an aspect of this application, a computer program product or a computer program is provided. The computer program product or the computer program includes computer instructions, and the computer instructions are stored in a computer-readable storage medium. A processor of a terminal reads the computer instructions from the computer-readable storage medium, and executes the computer instructions, so that the terminal performs the data processing method in a virtual scene provided in the optional implementations of the foregoing aspects.

After considering the specification and practicing the present disclosure, a person skilled in the art may easily conceive of other implementations of this application. This application is intended to cover any variations, uses or adaptive changes of this application. These variations, uses or adaptive changes follow the general principles of this application, and include well-known knowledge and conventional technical means in the art that are not disclosed in this application. The specification and the embodiments are merely considered as examples, and the actual scope and spirit of this application are pointed out by the following claims.

This application is not limited to the accurate structures that are described above and that are shown in the accompanying drawings, and modifications and changes may be made without departing from the scope of this application. The scope of this application is limited by the appended claims only.

What is claimed is:

1. A data processing method in a virtual scene, performed by a second computing terminal, the method comprising:
    displaying scene pictures of a virtual scene on a display screen of the second computing terminal, the virtual scene being a game scene including a main virtual object controlled by the second computing terminal and one or more first virtual objects that are teammates of the main virtual object;

in response to detecting a trigger operation on an icon of a target virtual object in a first scene picture of the virtual scene, displaying a path planning interface on the display screen, wherein the path planning interface comprises a second minimap, the target virtual object is one of the teammates of the main virtual object and is controlled by a first computing terminal;

receiving an operation instruction, the operation instruction being triggered by a route drawing operation on the second minimap displayed on the second computing terminal;

generating path information of the target virtual object in the virtual scene based on the operation instruction; and transmitting the path information to the first computing terminal, the first computing terminal displaying a path trajectory corresponding to the path information on a first minimap that is displayed by the first computing terminal.

2. The method according to claim 1, wherein:
the icon of the target virtual object is a signal trigger control corresponding to the target virtual object superimposed on the first virtual scene picture displayed on the second computing terminal, the signal trigger control being a control that displays information of the target virtual object; and
the path planning interface is displayed in response to a trigger operation on the signal trigger control.

3. The method according to claim 1, wherein the displaying the path planning interface comprises:
displaying the path planning interface when a trigger operation on the target virtual object in the virtual scene is received.

4. The method according to claim 1, further comprising:
displaying an object icon of the target virtual object on the second minimap based on a position of the target virtual object in the virtual scene.

5. The method according to claim 1, wherein object icons of the one or more first virtual objects are displayed on the second minimap, and the route drawing operation being an operation performed on a target object icon of the target virtual object.

6. The method according to claim 5, wherein the route drawing operation comprises a sliding operation started from a first object icon in the second minimap; and
the generating path information of the target virtual object in a virtual scene based on the operation instruction comprises:
determining the first virtual object corresponding to the first object icon as the target virtual object based on the operation instruction; and
generating the path information of the target virtual object in the virtual scene based on the sliding operation.

7. The method according to claim 5, wherein the route drawing operation comprises a click operation on a first object icon in the second minimap, and a sliding operation on the second minimap; and
the generating path information of the target virtual object in a virtual scene based on the operation instruction comprises:
determining the first virtual object corresponding to the first object icon as the target virtual object based on the operation instruction; and
generating the path information of the target virtual object in the virtual scene based on the sliding operation.

8. The method according to claim 5, wherein before the generating path information of the target virtual object in a virtual scene based on the operation instruction, the method further comprises:
highlighting the object icons of the one or more first virtual objects in the second minimap.

9. The method according to claim 1, wherein the second minimap comprises a highlighted region, the highlighted region being a region corresponding to an obstacle in the virtual scene in the second minimap.

10. A non-transitory computer-readable storage medium, storing at least one instruction, at least one program, a code set, or an instruction set, the at least one instruction, the at least one program, the code set, or the instruction set being loaded and executed by a processor of a second computing terminal to implement:
displaying scene pictures of a virtual scene on a display screen of the second computing terminal, the virtual scene being a game scene including a main virtual object controlled by the second computing terminal and one or more first virtual objects that are teammates of the main virtual object;
in response to detecting a trigger operation on an icon of a target virtual object in a first scene picture of the virtual scene, displaying a path planning interface on the display screen, wherein the path planning interface comprises a second minimap, the target virtual object is one of the teammates of the main virtual object and is controlled by a first computing terminal;
receiving an operation instruction, the operation instruction being triggered by a route drawing operation on the second minimap displayed on the second computing terminal;
generating path information of the target virtual object in the virtual scene based on the operation instruction; and
transmitting the path information to the first computing terminal, the first computing terminal displaying a path trajectory corresponding to the path information on a first minimap that is displayed by the first computing terminal.

11. The computer-readable storage medium according to claim 10, wherein the displaying the path planning interface comprises:
displaying the path planning interface in a case a signal trigger control corresponding to the target virtual object is superimposed on the first virtual scene picture displayed on the second computing terminal, and a trigger operation on the signal trigger control is received, the signal trigger control being a control that displays information of the target virtual object.

12. The computer-readable storage medium according to claim 10, wherein the displaying the path planning interface comprises:
displaying the path planning interface when a trigger operation on the target virtual object in the virtual scene is received.

13. The computer-readable storage medium according to claim 10, wherein:
the route drawing operation is an operation performed on the target virtual object on the second minimap;
object icons of the first virtual objects are displayed on the second minimap, and the route drawing operation is an operation performed on the object icon of the target virtual object.

14. A second computing terminal, comprising:
a display screen, at least one processor and at least one memory, the memory storing one or more computer programs, the computer programs, when being executed by the at least one processor, causing the at least one processor to implement:

displaying scene pictures of a virtual scene on the display screen, the virtual scene being a game scene including a main virtual object controlled by the second computing terminal and one or more first virtual objects that are teammates of the main virtual object;

in response to detecting a trigger operation on an icon of a target virtual object in a first scene picture of the virtual scene, displaying a path planning interface on the display screen, wherein the path planning interface comprises a second minimap, the target virtual object is one of the teammates of the main virtual object and is controlled by a first computing terminal;

receiving an operation instruction, the operation instruction being triggered by a route drawing operation on the second minimap displayed on the second computing terminal;

generating path information of the target virtual object in the virtual scene based on the operation instruction; and transmitting the path information to the first computing terminal, the first computing terminal displaying a path trajectory corresponding to the path information on a first minimap that is displayed by the first computing terminal.

15. The second computing terminal according to claim 14, wherein:

the icon of the target virtual object is a signal trigger control corresponding to the target virtual object superimposed on the first virtual scene picture displayed on the second computing terminal, the signal trigger control being a control that displays information of the target virtual object; and the path planning interface is displayed in response to a trigger operation on the signal trigger control.

16. The second computing terminal according to claim 14, wherein object icons of the one or more first virtual objects are displayed on the second minimap, and the route drawing operation being an operation performed on a target object icon of the target virtual object.

17. The second computing terminal according to claim 16, wherein the route drawing operation comprises a sliding operation started from a first object icon in the second minimap; and the generating path information of the target virtual object in a virtual scene based on the operation instruction comprises:

determining the first virtual object corresponding to the first object icon as the target virtual object based on the operation instruction; and generating the path information of the target virtual object in the virtual scene based on the sliding operation.

18. The second computing terminal according to claim 16, wherein the route drawing operation comprises a click operation on a first object icon in the second minimap, and a sliding operation on the second minimap; and the generating path information of the target virtual object in a virtual scene based on the operation instruction comprises:

determining the first virtual object corresponding to the first object icon as the target virtual object based on the operation instruction; and generating the path information of the target virtual object in the virtual scene based on the sliding operation.

19. The method according to claim 5, wherein: the rout drawing operation on the second minimap includes multiple drawing operations performed on multiple object icons of the first virtual objects, and the method further comprises:

generating path information of multiple first virtual objects based on the multiple drawing operations, each path information corresponding to one of the multiple object icons being performed on; and separately sending the path information of the multiple first virtual objects to a corresponding computing terminal.

* * * * *